US010332075B2

(12) United States Patent
Kaminsky et al.

(10) Patent No.: US 10,332,075 B2
(45) Date of Patent: Jun. 25, 2019

(54) NEAREST KNOWN PERSON DIRECTORY FUNCTION

(71) Applicant: International Business Machines Corporation, Armonk, NY (US)

(72) Inventors: David Louis Kaminsky, Chapel Hill, NC (US); David M. Ogle, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/493,251

(22) Filed: Apr. 21, 2017

(65) Prior Publication Data

US 2017/0221003 A1    Aug. 3, 2017

Related U.S. Application Data

(63) Continuation of application No. 10/404,297, filed on Mar. 31, 2003, now Pat. No. 9,633,331.

(51) Int. Cl.
| | | |
|---|---|---|
| *G06F 17/30* | (2006.01) | |
| *G06Q 10/10* | (2012.01) | |
| *G06F 16/2455* | (2019.01) | |

(52) U.S. Cl.
CPC ..... *G06Q 10/109* (2013.01); *G06F 16/24553* (2019.01); *G06Q 10/10* (2013.01)

(58) Field of Classification Search
None
See application file for complete search history.

(56) References Cited

U.S. PATENT DOCUMENTS

| | | |
|---|---|---|
| 6,539,379 B1 | 3/2003 | Vora et al. |
| 6,625,615 B2 | 9/2003 | Shi et al. |
| 6,678,692 B1 | 1/2004 | Hyatt |
| 6,714,936 B1 | 3/2004 | Nevin, III |
| 6,768,988 B2 | 7/2004 | Boreham et al. |
| 6,792,421 B2 | 9/2004 | Wyse |
| 2004/0044659 A1 | 3/2004 | Judd et al. |
| 2005/0085241 A1 | 4/2005 | Bahl et al. |

*Primary Examiner* — Alicia M Willoughby
(74) *Attorney, Agent, or Firm* — Steven M. Greenberg, Esq.; Shutts & Bowen LLP

(57) ABSTRACT

A system for matching nearest contacts in a logical contact hierarchy can include a logical contact hierarchy disposed in a database; and, a hierarchical query processor coupled to the logical contact hierarchy. The hierarchical query processor can be configured to produce a closest matching contact from among contacts in the logical contact hierarchy based upon a specified anchor contact in the logical contact hierarchy. A boolean operator further can be programmed to select a closest matching contact based upon a boolean expression operating upon multiple closest matching contacts produced by the hierarchical query processor.

6 Claims, 2 Drawing Sheets

NEAREST KNOWN PERSON DIRECTORY FUNCTION

CROSS-REFERENCE TO RELATED APPLICATIONS

This application is a Continuation of U.S. patent application Ser. No. 10/404,297, filed on Mar. 31, 2003, the entirety of which is herein incorporated by reference.

BACKGROUND OF THE INVENTION

Statement of the Technical Field

The present invention relates to the field of groupware, and more particularly to contact management.

Description of the Related Art

Contact management predates the use of personal computers and has formed the foundation of organizational communications. Early attempts at managing external contacts include the simple address book, the Rolodex™, the Filofax™ and straightforward customer lists. Internally, organizational contacts had been managed through traditional internally distributed phone lists and direct-dial tables. More recently, contact management has been automated through the use of electronic address books, sometimes coupled to electronic mail address books. At the extreme, full-blown personal information management applications provide comprehensive contact management facilities and such applications represent the lifeblood of the sales industry.

While contact management applications serve the purpose of storing contacts for easy, fast retrieval, contact management applications cannot in of themselves provide an abstract representation of the relationship between contacts and contact characteristics, including job title, location, expertise, etc. Organizational charts typically form an abstract representation of contacts in a firm as the contacts relate to one another. Drawing programs, and even organizational chart programs, provide an electronic method of creating and managing contacts in an organizational chart. Still, organizational charts alone cannot relate contacts to one another based upon the type of query typical in a contact management application.

In this regard, contact management applications typically provide the end user with the ability to query the application for a person having a particular static characteristic such as last name, address, department, title, and the like. Yet, relational queries such as, "Find the person whose office is closest to my office" are not possible using conventional contact management applications. Worse yet, boolean operations implicating relations between contacts remain similarly impossible. Thus, as an example, the boolean operation "Find the person whose office is closest either to my office or the office of my supervisor" remains an impossibility for conventional contact management systems.

SUMMARY OF THE INVENTION

The present invention is a nearest known person directory function for contact management systems which overcomes the deficiencies of conventional contact management systems and provides a novel and non-obvious method and system for conducting boolean operations implicating relations between contacts in a contact management system. A method for matching nearest contacts in a logical contact hierarchy, can include establishing an anchor contact in the logical contact hierarchy. In this regard, the logical contact hierarchy can be a hierarchical structure of contacts in which the position of each contact in the hierarchy is based upon the relationship between other contacts in the hierarchy. As an example, such relationship can include the office locations of the contacts with respect to one another, the seniority of a contact within an organization as expressed in terms of supervisory capacity, rank, role or tenure, and any other differentiating characteristics.

In accordance with the inventive arrangements, a distance within the logical contact hierarchy can be computed between the anchor contact and a selected contact for each contact in the logical contact hierarchy. In this regard, a relationship can be established between the anchor contact and the selected contact for each contact in the hierarchy. Subsequently, the magnitude of that relationship can be measured to identify the distance between the contacts within the logical hierarchy. Finally, a contact can be selected as a closest matching contact from among the contacts in the logical contact hierarchy having a shortest computed distance in the logical contact hierarchy.

Notably, each of the establishing, computing and selecting steps can be repeated for at least one additional anchor contact in the logical contact hierarchy. Subsequently, at least one boolean operation can be performed on each closest matching contact produced by the repeating step for each anchor contact to compute a boolean closest matching contact in the logical contact hierarchy. In one aspect of the invention, the logical contact hierarchy can define a hierarchical structure of seniority or superiority (in terms of role, tenure or supervisory capacity) of employees in an organization. Alternatively, the logical contact hierarchy can define office locations of contacts in an organization.

In this regard, the distance between office locations of contacts in an organization can be seen as a continuous function which requires an ordering of contacts in terms of nearest to furthest. It will be recognized by one skilled in the art that the continuous nature of distance does not lend itself as naturally to a hierarchical structure as other types of relationships, for instance seniority or superiority. Yet, though an ordering of contacts in terms of distance remains the degenerate case of a hierarchy, the invention still can accommodate such a structure simply by computing the distance between contacts along a hierarchy structured as a linear path.

A system for matching nearest contacts in a logical contact hierarchy can include a logical contact hierarchy disposed in a database; and, a hierarchical query processor coupled to the logical contact hierarchy. The hierarchical query processor can be configured to produce a closest matching contact from among contacts in the logical contact hierarchy based upon a specified anchor contact in the logical contact hierarchy. A boolean operator further can be programmed to select a closest matching contact based upon a boolean expression operating upon multiple closest matching contacts produced by the hierarchical query processor.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for matching nearest contacts in a contact hierarchy. In particular, boolean operations can be performed in nearest matches for multiple contacts in the hierarchy. In this way, intra-contact relationships can be computed which can include geographic distances, rankings of authority, departmental distinctions and the like. More particularly, where the relationships between contacts in an organization can be modeled within a hierarchy, regardless of the type of relationship, the nearest matching contact system and method of the present invention can compute a nearest match for a specified anchor contact, or a contact resulting from a boolean operation of two or more nearest matches for a specified anchor contact.

Figure 1:
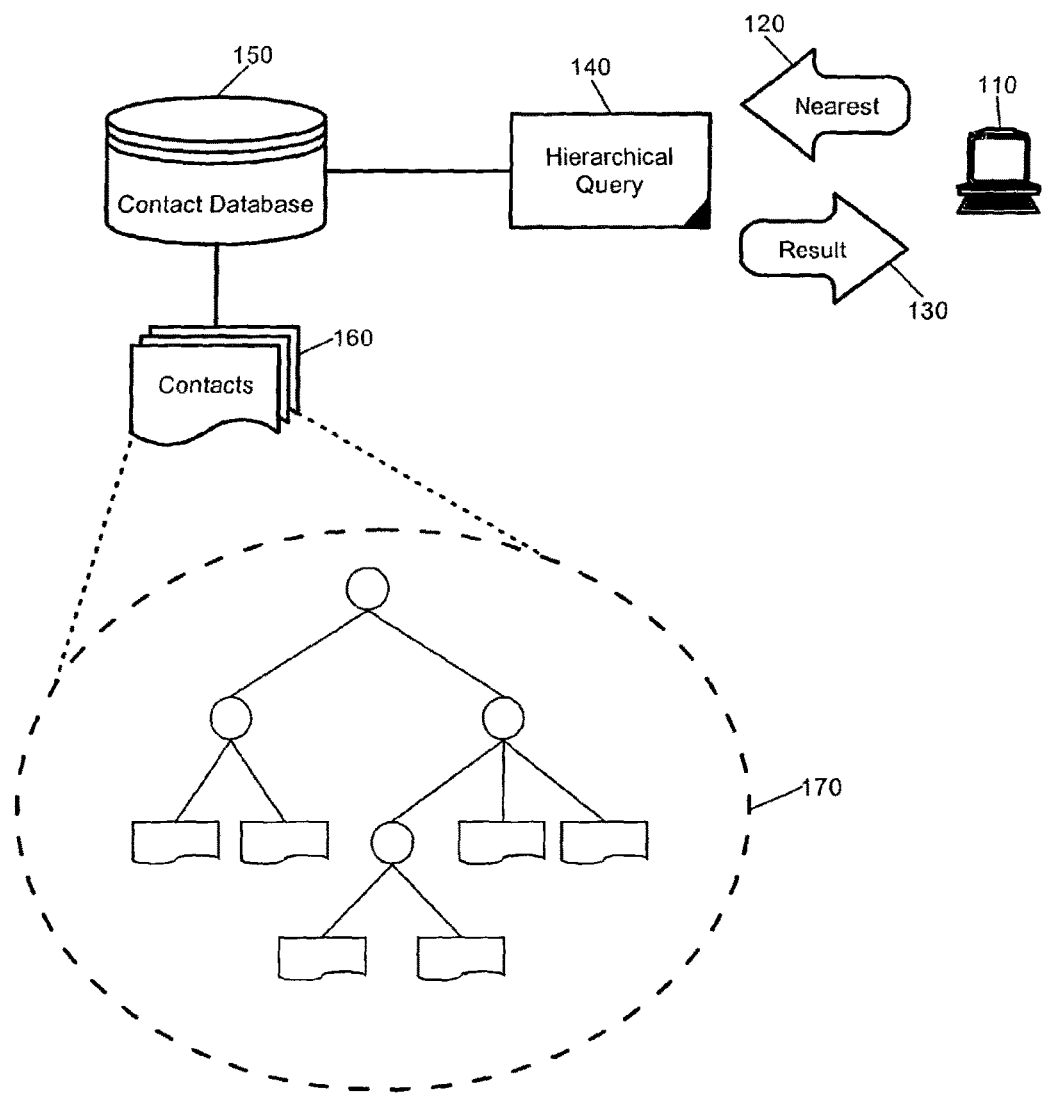
FIG. 1 is a pictorial illustration of a system and method for matching nearest contacts in a contact hierarchy in accordance with one aspect of the inventive arrangements; and, FIG. 2 is a flow chart illustrating a process for computing a boolean outcome for nearest matching contacts in the contact hierarchy of FIG. 1.

FIG. 1 is a pictorial illustration of a system and method for matching nearest contacts in a contact hierarchy in accordance with one aspect of the inventive arrangements. In accordance with the present invention, a contact database 150 can include a set of organizational contacts 160 which can be organized into a logical hierarchy 170 based upon the relationship between each of the contacts 160. In this regard, a set of organizational contacts 160 can be stored with suitable data to reproduce the hierarchy 170, or a separate table can be produced based upon the stored organizational contacts 160 to produce the hierarchy 170. In any case, the hierarchy 170 itself can represent a hierarchical structure of contacts based upon any contact characteristic, such as contact seniority within the organization, contact location, and the like.

A hierarchical query processor 140 can be included in the system of the present invention. The hierarchical query processor 140 can process requests 120 from requestors 110 for matching a nearest contact based upon an anchor contact reference. In this regard, the hierarchical query processor 140 can traverse the hierarchy 170 to determine which contact can be determined to be closest to the anchor contact reference within the hierarchy 170. Once again, by reference to "closest", it is meant that a contact is closest relationally to the anchor contact, rather than merely geographically. Thus, the hierarchical query processor 140 can perform a relationship function that determines the magnitude of a given relationship between an anchor and a contract in the hierarchy 170.

To that end, where the hierarchy 170 represents a logical hierarchical structure of seniority rather than geographic positioning, "closest" can refer to the contact which is related to the anchor contact at the closest level of seniority. By comparison, where the hierarchy 170 represents logical hierarchical structure of the location of contacts in a building or corporate campus, "closest" can refer to the contact whose office is most proximate to the anchor contact. In any event, the hierarchical query processor 140 can determine the closest match to the anchor contact in the hierarchy 170 and can produce such closest match as a result 130.

Figure 2:
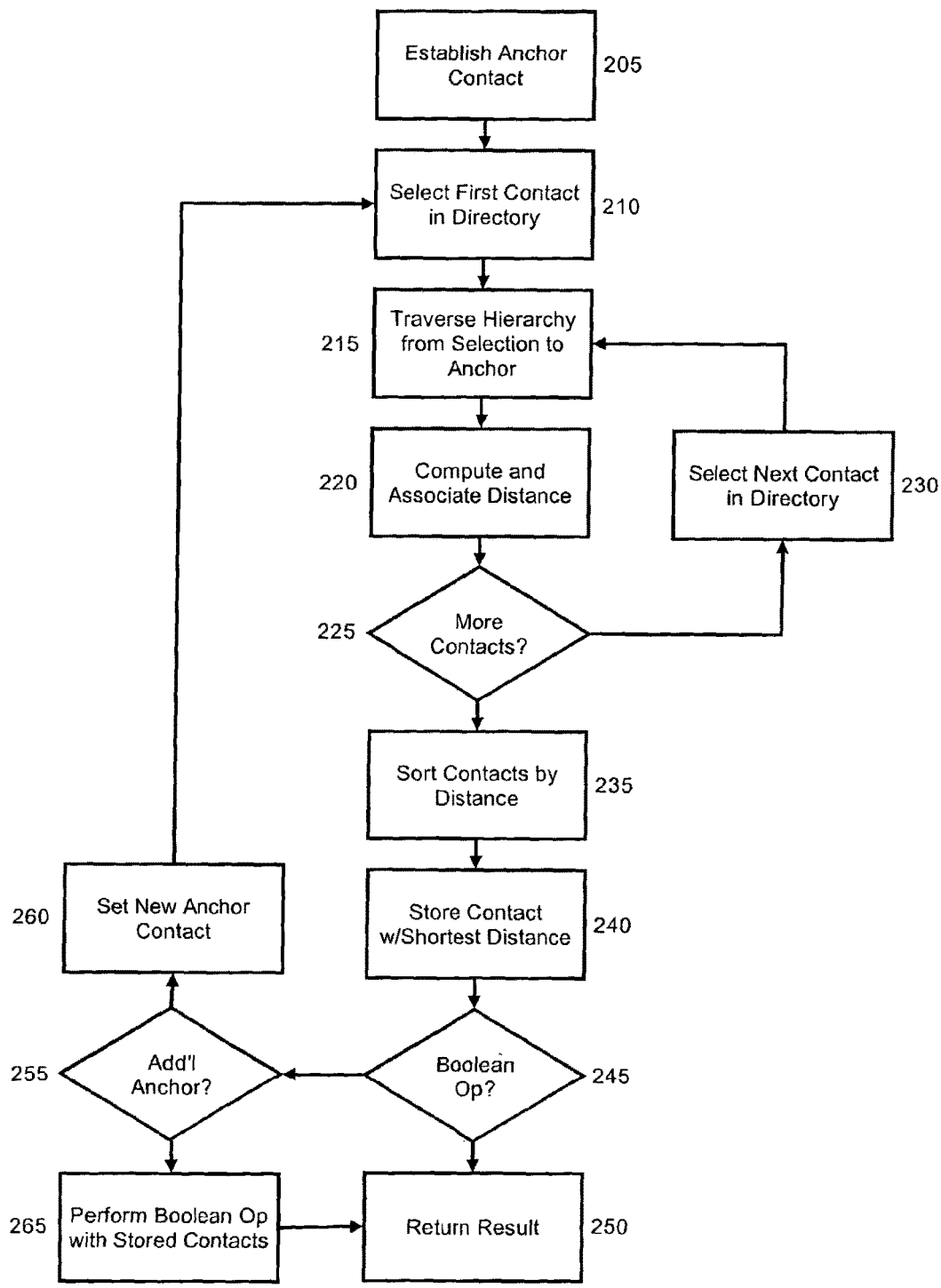

FIG. 2 is a flow chart illustrating a process for computing a boolean outcome for nearest matching contacts in the contact hierarchy of FIG. 1. Beginning in block 205, an anchor contact within the hierarchy can be established to form the basis of a matching exercise. In block 210 the first contact in the directory of contacts can be selected. In block 215, the hierarchy can be traversed from the selected contact to the anchor contact. Finally, in block 220, a distance can be computed from the selected contact to the anchor contact. Once computed, the distance can be associated with the selected contact, for instance by writing a distance record to a contact node in a list of contacts.

In decision block 225, it can be determined whether additional contacts remain to be analyzed in respect to the anchor contact. If so, in block 230 a next contact can be selected in the directory and the process of blocks 215 through 225 can repeat. Otherwise, when no further contacts remain to be analyzed, in block 235 the list of contacts and their associated distances can be sorted according to distance. In block 240, the contact having the shortest distance to the anchor contact can be stored as the "nearest" or "closest" matching contact.

Notably, in accordance with the inventive arrangements, boolean operations can be performed on individually located nearest contacts. For instance, the query, "Find the person whose office is closest either to my office or the office of my supervisor" can be supported by conducting two separate closest matching contact analyses, followed by a boolean evaluation of both results. To support boolean operations in this way, in decision block 245 it can be determined whether a boolean operation has been set forth in a query.

If not, in block 250 the stored result simply can be returned. Otherwise, the process can continue through blocks 255 through 265. Specifically, if in decision block 255, for the additional query, an additional anchor contact will be required, in block 260 the additional anchor contact can be established and the closest matching process can repeat in blocks 210 through 245. Once complete, in block 265 the boolean operation can be performed upon the stored closest matches for each anchor contact. The result can be returned in block 250.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for matching nearest contacts in a logical contact hierarchy, comprising:
   a computing system with a processor and memory and a database;
   and,
   a hierarchical query processor coupled to said logical contact hierarchy and configured to store in the database, a table representative of a logical contact hierarchy comprising an anchor contact from amongst the different contacts that forms a basis for matching nearest contacts in the logical contact hierarchy, to receive a query specifying an anchor contact and in response to the query, utilize the table stored in the database to produce a closest matching contact from among contacts in said logical contact hierarchy based upon the specified anchor contact by computing a distance between the anchor contact and each different contact within the logical contact hierarchy, wherein the distance indicates a non-geographical relationship between said anchor contact and each of the different contacts, the non-geographical relationship referring to a closest level of seniority between each different contacts and the anchor contact, selecting a contact, as a nearest matching contact, from among the different contacts in said logical contact hierarchy having a shortest computed distance to the anchor contact within the logical contact hierarchy and returning the nearest matching contact as a result to the query, unless a boolean operation is set forth in the query, in which case the hierarchical query processor specifies an additional anchor contact, produces an additional nearest matching contact from among the contacts in said logical contact hierarchy based upon the additional specified anchor contact, performs the boolean operation set forth in the query upon both nearest matching contacts and returns a result of the boolean operation as a result to the query.

2. The system of claim 1, wherein said logical contact hierarchy additionally defines a hierarchical structure of seniority of employees in an organization.

3. The system of claim 1, wherein said logical contact hierarchy additionally defines office locations of contacts in an organization.

4. A non-transitory machine readable storage medium having stored thereon a computer program for matching nearest contacts in a logical contact hierarchy, said computer program comprising a routine set of instructions for causing the machine to perform the steps of:
   storing in a database, a table representative of a logical contact hierarchy comprising an anchor contact from amongst the different contacts that forms a basis for matching nearest contacts in the logical contact hierarchy,
   receiving a query specifying an anchor contact by a hierarchical query processor executing in the machine, the anchor contact forming a basis for matching nearest contacts in the logical contact hierarchy;
   utilizing the table stored in the database so as to compute a distance within the logical contact hierarchy between said anchor contact and each different contact within the logical contact hierarchy, wherein the distance indicates a non-geographical relationship between said anchor contact and each of the different contacts, the non-geographical relationship referring to a closest level of seniority between each different contacts and the anchor contact; and,
   selecting in the table as a closest matching contact, a contact from among said different contacts in said logical contact hierarchy having a shortest computed distance to the anchor contact within the logical contact hierarchy; and,
   returning the nearest matching contact as a result to the query, unless a boolean operation is set forth in the query, in which case the hierarchical query processor specifies an additional anchor contact, produces an additional nearest matching contact from among the contacts in said logical contact hierarchy based upon the additional specified anchor contact, performs the boolean operation set forth in the query upon both nearest matching contacts and returns a result of the boolean operation as a result to the query.

5. The machine readable storage of claim 4, wherein the logical contact hierarchy additionally defines a hierarchical structure of seniority of employees in an organization.

6. The machine readable storage of claim 4, wherein the logical contact hierarchy additionally defines office locations of contacts in an organization.

* * * * *